United States Patent [19]

Kirschner

[11] Patent Number: 4,471,478

[45] Date of Patent: Sep. 11, 1984

[54] VIDEO DISC PLAYER HAVING CARRIAGE LOCKING MECHANISM

[75] Inventor: Thomas F. Kirschner, Indianapolis, Ind.

[73] Assignee: RCA Corporation, New York, N.Y.

[21] Appl. No.: 456,334

[22] Filed: Jan. 6, 1983

[51] Int. Cl.³ .............................................. G11B 3/10
[52] U.S. Cl. ...................................... 369/292; 369/170
[58] Field of Search ........................ 369/77.2, 292, 170

[56] References Cited

U.S. PATENT DOCUMENTS 4,342,394 8/1982 Taylor ................................. 369/170

OTHER PUBLICATIONS

Service Manual for 2506/07 Compact, H. H. Scott, Aug. 1971.

Primary Examiner—Steven L. Stephan
Attorney, Agent, or Firm—Paul J. Rasmussen; William H. Meise; Dilip A. Kulkarni

[57] ABSTRACT

The video disc player is provided with a pair of carriage locking devices to securely lock the carriage in place during handling and shipping. Each of the carriage locking devices comprises a carriage locking pin, a device locking tab and a handle. Upon arrival of the player at its final destination, the locking devices are removed to free the carriage.

1 Claim, 8 Drawing Figures

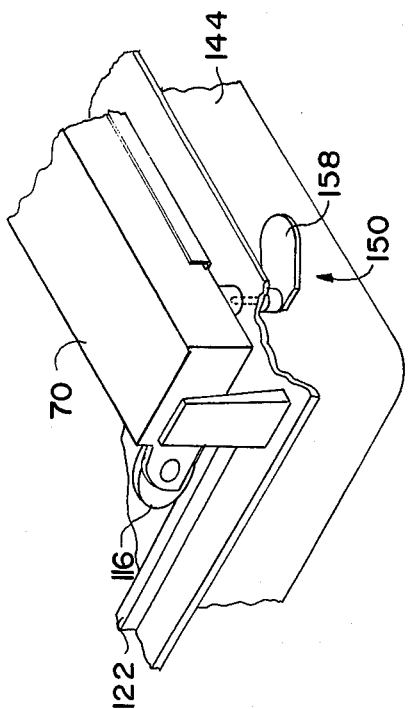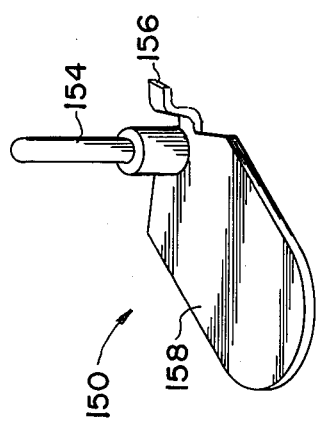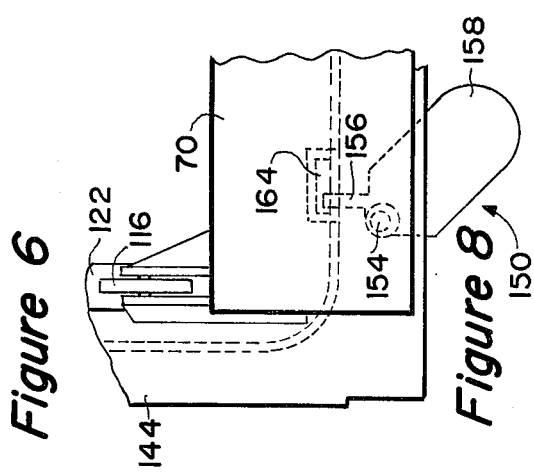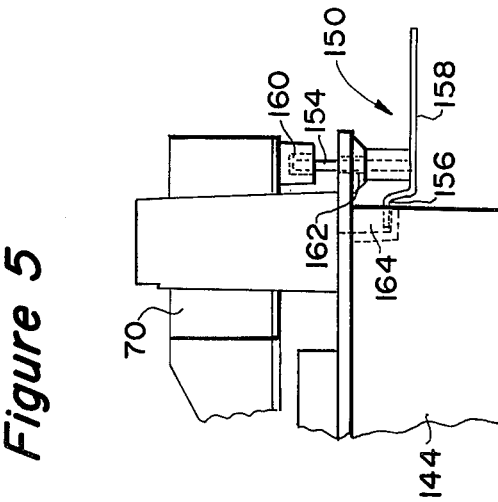

VIDEO DISC PLAYER HAVING CARRIAGE LOCKING MECHANISM

This invention relates to a video disc player, and more particularly, to a system for protecting the player mechanisms during handling and shipping.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In video disc systems, the information track density is generally quite high. For example, the above-mentioned capacitance-type system uses a spirally-grooved information track with a groove density of nearly 10,000 grooves per inch (groove width=approximately 2.5 micrometers). During playback, the stylus tip is received in the groove and guided toward the record center as a turntable-supported record revolves at the desired speed. The microscopic groove geometries require a stylus that has rather fine dimensions (e.g., stylus tip width=2 micrometers, stylus tip length=5 micrometers and stylus tip height=3 micrometers). It is generally the practice with such high density records (both grooved and flat records) to mount the signal recovery stylus in a protective cartridge which, in turn, is installed in a carriage. The carriage is slidably mounted in the player for motion between a rest position and an end-of-play position. During playback, the carriage is driven so that it follows the radially inward motion of the groove-guided stylus. The bottom wall of the carriage has an elongated aperture through which the stylus extends for engagement with a turntable-supported record for playback. A stylus lifter mechanism is housed in the carriage for selectively lowering the stylus for record engagement.

It is desirable to protect the carriage during handling and shipping. Any undue vibrations can cause the carriage to move around, thereby creating a possibility of damaging the carriage support and drive mechanisms. The movement of the carriage can also produce disturbances that could damage the stylus.

The carriage locking mechanism, in accordance with this invention, comprises a carriage locking means removably mounted to the housing of the player for motion between a first position and a second position. The carriage locking means has a first portion which engages the carriage to firmly lock it in place, when the carriage is at the rest position and the carriage locking means is mounted to the housing. The carriage locking means has a second portion which is received in a recess provided in the housing to prevent its removal therefrom, when the carriage locking means is mounted to the housing and disposed in the second position thereof. The carriage locking means is subject to removal from the player when it is disposed in its first position.

In accordance with a further feature of the invention, a carriage locking means is provided at each end of the carriage to securely lock both ends of the carriage in place during transit. In the drawings:

FIG. 1 is a perspective view of a video disc player utilizing a carriage locking mechanism of the present invention;

FIG. 2 gives a perspective view of a pickup cartridge suitable for use with the player of FIG. 1;

FIG. 5. illustrates a carriage locking device of the subject invention;

FIG. 6. depicts a partial perspective view of the player with the FIG. 5 carriage locking device mounted to the player housing at the front right hand corner thereof; and FIGS. 7 and 8, respectively, show the end view and the top view of the FIG. 6 locking device.

Figure 1:
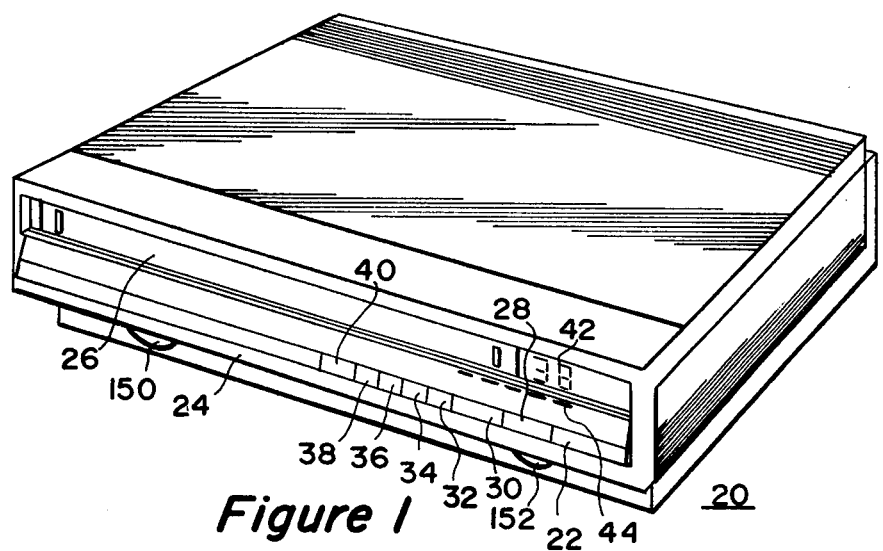

Shown in FIG. 1 is a video disc player 20 incorporating the present carriage locking mechanism. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The record is automatically deposited on the turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward/reverse)—to enable the viewer to quickly locate a precise section of the prerecorded program. In visual search, the stylus is rapidly moved across the record (16×) while in engagement therewith. In rapid access, the stylus is swept across the record at a much greater speed (120×) while the stylus is down. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
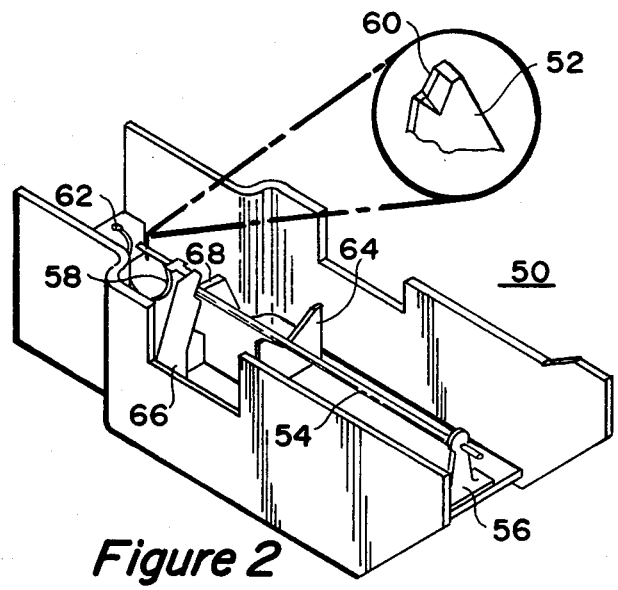
Figure 3:
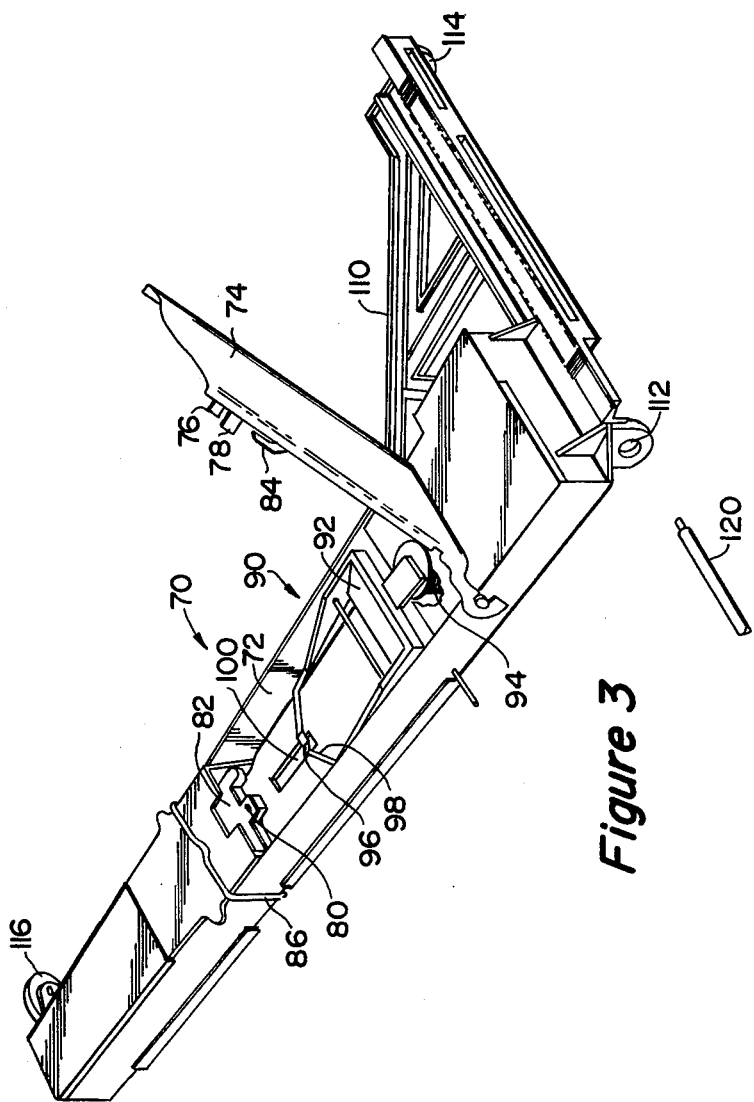
FIG. 3 represents a translatably-mounted carriage arm in which the FIG. 2 cartridge is housed.

FIG. 2 is a perspective view of a stylus cartridge 50, shown upside-down, comprising a stylus 52 firmly secured at one end of an elongated, tubular stylus arm 54. The other end of the stylus arm 54 is flexibly suspended in the cartridge enclosure by a thin compliant suspension 56. The stylus tip is about 2 micrometers wide, 5 micrometers deep and 3 micrometers high. The stylus arm 54 is in the form of a hollow aluminum tube with the following dimensions: length=1.654 inches, outside diameter=0.044 inches and inside diameter=0.040 inches. A leaf spring or flylead 58, about 0.000560 inches thick, is connected at one end to a thin electrode 60 on the stylus 52. The end of the stylus electrode 60 is about 2 micrometers wide by 0.2 micrometers thick. The other end of the flylead 58 is connected to a terminal 62 disposed on the cartridge body. The flylead 58 provides the stylus/record engagement force, and also serves as the electrical connection between the stylus electrode 60 and the pickup circuitry located within the carriage arm. The stylus arm 54 is held back within the confines of the cartridge housing against a stop 64 by a set of retaining fingers 66 and 68. When the cartridge 50 is installed in the player, the retaining springs 66 and 68 are automatically spread apart to release the stylus arm 54.

A carriage 70 is provided with a compartment 72 for housing the cartridge 50. The cartridge compartment 72 is fitted with a swingable lid 74. When the cartridge 50 is inserted into the carriage compartment 72 and the lid 74 is closed, a pair of depending tabs 76 and 78 engage and spread apart the stylus arm retaining springs 66 and 68 to free the stylus arm 54. Upon reception of the cartridge 50 in the compartment 72, the cartridge terminal 62 engages an input terminal 80 of the pickup circuits 82 housed in the carriage 70. A leaf spring 84 attached to the underside of the lid 74 firmly seats the cartridge 50 in the carriage compartment 72, when the lid is held shut by a wire hoop 86.

Mounted in the carriage 70 is a stylus lifting/lowering device 90 including a pivotally-mounted bracket 92, and a selectively-actuated electromagnet 94. When the lid 74 is locked shut after installation of the cartridge 50 in the carriage compartment 72, the stylus arm 54 comes to rest in a raised position in a centering depression 96 provided on the cross member 98 of the lifter bracket 92. Normally, the stylus arm bracket 92 is biased to occupy the lifted position thereof. Upon energization of the electromagnet 94, the lifter bracket 92 is gently lowered to set the stylus 52 down on a turntable-supported record through an elongated opening 100 in the bottom wall of the carriage 70.

Figure 4:
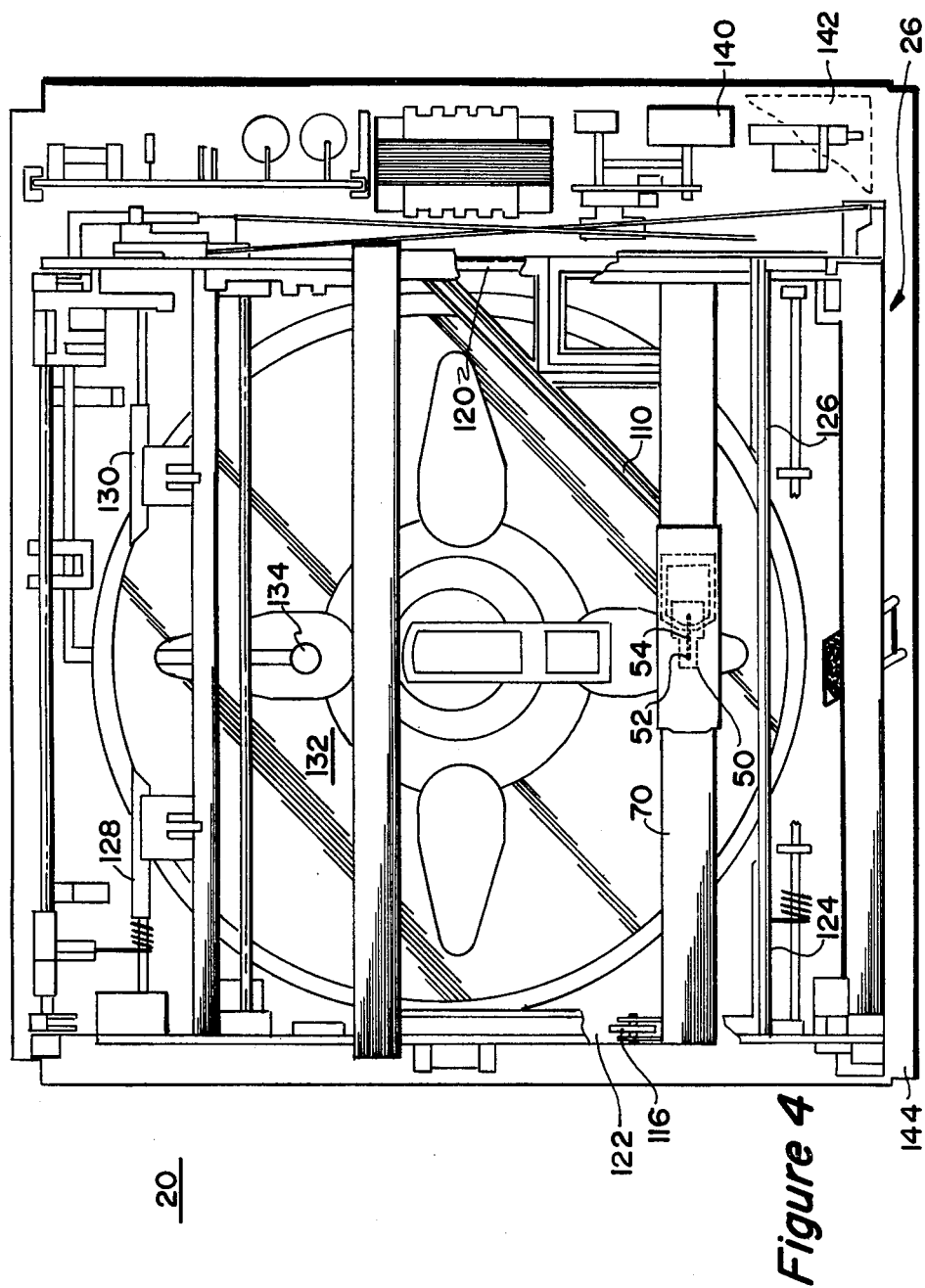
FIG. 4 shows a top view of the video disc player of FIG. 1 with its cover removed to show the underlying details.

The carriage 70 is provided with a support bracket 110 on one side thereof. The carriage support bracket 110 is equipped with a pair of openings 112 and 114 through which a guide rod 120 is passed. The guide rod 120 is fixedly mounted to the player to support the motion of the carriage 70 between an off-record rest position toward the front end of the player and an on-record, end-of-play position near the turntable center as can be seen from FIG. 4. Disposed at the other end of the carriage 70 is a guide wheel 116 which rides on a track 122 which is arranged parallel to the guide rod 120.

To load a record, a full caddy is inserted into the player through an input slot 26. Upon the extraction of the empty sleeve from the player, the enclosed record is left therein resting on a set of receiving pads 124, 126, 128 and 130. The retained record is automatically transferred to a rotatable turntable 132 by a record transfer mechanism including a record handling finger 134. A motor located underneath the turntable 132 drives it to rotate at the desired speed (e.g., 450 rpm). U.S. patent application, Ser. No. 374,377, filed for Hughes, and entitled "DISC PLAYER HAVING RECORD HANDLING APPARATUS", now U.S. Pat. No. 4,439,852, describes a suitable record extraction and transfer mechanism.

A stepper motor 140 drives the carriage 70 from the off-record rest position to a starting position over the turntable-supported record, and the stylus arm lifting/lowering device 90 is energized to lower the stylus 52 onto the record. During playback, the carriage 70 is driven toward the record center so as to cause it to track the radially-inward motion of the stylus 52. The signals at the output of the reproducing stylus 52 are processed by the pickup circuits 82 housed in the carriage 70, and fed to signal processing circuitry disposed on a signal board 142 attached to the player housing 144 of the player. The signal processing circuitry 142 converts the signals at the output of the pickup circuits 82 into a form suitable for application to a conventional television receiver. When the carriage 70 reaches the end-of-play position, the stylus 52 is raised and the carriage is driven back until it operates a microswitch to reset it at its off-record rest position. The record is automatically transferred back to the record receiving pads 124, 126, 128 and 130. The record is then retrieved from the player by inserting an empty sleeve into the player and withdrawing it therefrom.

In a high density information record reproduction system—such as the video disc player described above, it is improtant to maintain an accurate relationship between the carriage 70 and other player mechanisms—e.g., the spacing between the carriage and the turntable 132, the perpendicularity of the carriage with respect to the guide rod 120, and so on. Undue vibrations during handling and shipping of the player could possibly cause misalignment of the carriage 70. As previously indicated, there is also a possibility of damaging the stylus 52 during transit.

In accordance with this invention, a pair of carriage locking devices 150 and 152 are provided at each end of the player housing 144 to securely hold the carriage 70 at its rest position during handling and shipping. Because the construction and operation of both the locking devices 150 and 152 are the same, only one device 150 mounted at the left hand, front end of the player housing 144 will be described in conjunction with FIGS. 5–8. The other device 152 is mounted to the player housing 144 at the front, right hand corner of the player to firmly secure the right hand side of the carriage 70 in a similar fashion.

The carriage locking device 150 includes a carriage locking pin 154, an offset locking tab 156, and a handle 158. To mount the carriage locking device 150 to the player, the carriage 70 is brought to the rest position toward the front end of the player and the carriage locking pin 156 is inserted into an opening 160 provided in the carriage through another opening 162 disposed in the player housing 144. The two openings 160 and 162 are arranged to be in registration with each other when the carriage 70 is occupying the off-record standby position thereof.

To prevent inadvertent removal of the carriage locking device 150 from the player, the device is turned anticlockwise after insertion to cause the device locking tab 156 to enter into a recess 164 provided in the player housing 144. The offset tab 156 is slightly twisted to provide an interference fit between it and the recess 164 in the player housing 144 so as to prevent its accidental separation.

After arrival of the player at its final destination, the carriage locking devices 150 and 152 are removed from the player to free the carriage 70. The carriage locking devices 150 and 152 may be saved for future use. To release the carriage locking device 150, for instance, the device is rotated clockwise to extract the offset tab 156 from the recess 164 in the player housing 144, and then the device handle 158 is pressed down to disengage the carriage locking pin 154 from the openings 160 and 162 in the carriage 70 and the housing respectively.

Although a particular embodiment of the invention is disclosed herein, several modifications thereof are possible. For example, the interference fit between the locking tab 156 and the housing recess 164 can be instead obtained by providing the recess with a slanted bottom surface. Also it is possible to provide the bottom surface of the recess 164 with a slight protrusion to prevent accidental removal of the locking device 150 from the player during handling and shipping. Further, to assist separation of the locking device 150 from the player, it can be fitted with a coil spring disposed about the locking pin 154.

The carriage locking mechanism, according to this invention, is simple, reliable and effective to fixedly secure the carriage 70 in place during handling and shipping.

What is claimed is:

1. In a record player including a pickup stylus subject to engagement with a turntable-supported record during playback; said stylus being mounted at one end of a stylus arm having its other end yieldably supported in a carriage; said carriage being translatably mounted to the housing of said player for motion between a rest position and an end-of-play position; the improvement comprising a carriage locking means removably mounted to said housing for motion between a first position and a second position; said housing being provided with a hole which is aligned with an opening disposed in said carriage when said carriage occupies said rest position; said carriage locking means having a pin portion which is subject to insertion through said hole in said housing into said opening in said carriage when said carriage is at said rest position to lock said carriage in place; said housing being further provided with a cavity; said carriage locking means having a tab portion which is received in said cavity in said housing to prevent removal of said carriage locking means from said housing when said carriage locking means is mounted to said housing and turned to said second position thereof; said carriage locking means being subject to removal from said player when it is disposed in said first position; said carriage locking means further having a handle portion to facilitate insertion of said pin portion through said hole in said housing into said opening in said carriage, and rotation thereof to said second position to insert said tab portion into said cavity in said housing in order to lock said carriage at said rest position and to secure said carriage locking means to said player.

* * * * *